United States Patent
Meng

(10) Patent No.: US 10,713,518 B2
(45) Date of Patent: Jul. 14, 2020

(54) SYSTEM AND METHOD FOR RECORDING AND REPORTING LICENSE NUMBER VIOLATION

(71) Applicant: TOYOTA MOTOR ENGINEERING & MANUFACTURING NORTH AMERICA, INC., Erlanger, KY (US)

(72) Inventor: Ming Michael Meng, Novi, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 122 days.

(21) Appl. No.: 15/882,677

(22) Filed: Jan. 29, 2018

(65) Prior Publication Data

US 2019/0236395 A1    Aug. 1, 2019

(51) Int. Cl.
| | |
|---|---|
| *G06K 9/32* | (2006.01) |
| *G06K 9/20* | (2006.01) |
| *H04N 5/92* | (2006.01) |
| *G08G 1/017* | (2006.01) |
| *B60R 1/00* | (2006.01) |
| *H04N 5/765* | (2006.01) |
| *G08G 1/052* | (2006.01) |

(52) U.S. Cl.
CPC ............ *G06K 9/3258* (2013.01); *B60R 1/00* (2013.01); *G06K 9/2081* (2013.01); *G08G 1/0175* (2013.01); *G08G 1/052* (2013.01); *H04N 5/765* (2013.01); *H04N 5/9206* (2013.01); *B60R 2300/80* (2013.01)

(58) Field of Classification Search
CPC ...... G06K 9/3258; G06K 9/2081; B60R 1/00; B60R 2300/80; G08G 1/0175; H04N 5/765; H04N 5/9206
See application file for complete search history.

(56) References Cited

U.S. PATENT DOCUMENTS

| | | | |
|---|---|---|---|
| 5,515,042 A | 5/1996 | Nelson | |
| 6,754,369 B1 * | 6/2004 | Sazawa | G06K 9/3266 382/105 |
| 7,474,204 B2 | 1/2009 | Songwe | |
| 9,110,774 B1 * | 8/2015 | Bonn | G06F 17/00 |
| 9,363,357 B2 | 6/2016 | Hansen | |
| 9,704,393 B2 * | 7/2017 | Acharya | H04N 7/18 |
| 10,504,094 B1 * | 12/2019 | Gaudin | G06Q 20/204 |

(Continued)

OTHER PUBLICATIONS

Google Scholar Search Results.*

*Primary Examiner* — Qun Shen
(74) *Attorney, Agent, or Firm* — Oblon, McClelland, Maier & Neustadt, L.L.P.

(57) ABSTRACT

A method and system for recording and reporting license plate indicia are provided. The method includes receiving an input command from a user of a vehicle requesting a capture of an image of license plate indicia of a second vehicle, capturing, via one or more cameras, one or more image of the license plate of the second vehicle, determining, using the processing circuitry, a license plate number from the captured one or more images of the license plate, and displaying the recognized license plate number on a display of the vehicle. The method further includes detecting a location of the vehicle and storing the determined license plate number, the location of the vehicle, and the image of the license plate indicia in an audio head unit or in a navigation unit.

17 Claims, 5 Drawing Sheets

(56) References Cited

U.S. PATENT DOCUMENTS

| | | | |
|---|---|---|---|
| 2002/0003571 A1* | 1/2002 | Schofield | B60R 11/0235 |
| | | | 348/148 |
| 2004/0218785 A1* | 11/2004 | Kim | G08G 1/0175 |
| | | | 382/105 |
| 2010/0073201 A1* | 3/2010 | Holcomb | G08G 1/005 |
| | | | 340/990 |
| 2013/0238441 A1 | 9/2013 | Panelli | |
| 2014/0036076 A1* | 2/2014 | Nerayoff | H04N 7/181 |
| | | | 348/148 |
| 2016/0210517 A1* | 7/2016 | Luo | G06K 9/2054 |
| 2016/0378861 A1 | 12/2016 | Eledath et al. | |
| 2018/0050800 A1* | 2/2018 | Boykin | H04N 5/23206 |
| 2019/0178660 A1* | 6/2019 | Greenberg | G01C 21/3655 |

* cited by examiner

SYSTEM AND METHOD FOR RECORDING AND REPORTING LICENSE NUMBER VIOLATION

BACKGROUND

A driver may encounter another driver on the road engaging in a dangerous driving behavior and may want to acquire the license plate number of the vehicle of the other driver. U.S. Pat. No. 5,515,042 entitled "Traffic enforcement device" by Nelson describes a method and a device that monitors traffic speed and gathers evidence.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a method for recording and reporting license plate indicia (e.g., alpha-numeric characters and additional graphic information) that receives an input (e.g., a voice) command from a user of a vehicle requesting a capture of an image of license plate indicia of a second vehicle; captures, via one or more cameras, one or more images of the license plate of the second vehicle; determines, using the processing circuitry, a license plate number from the captured one or more images of the license plate; and stores the deter mined license plate number and the image of the license plate indicia in an audio head unit or in a navigation unit.

The present disclosure relates to a system for reporting license plate numbers. The system includes one or more cameras and processing circuitry. The processing circuitry is configured to: receive an input command from a user of a vehicle requesting a capture of an image of the license plate indicia of a second vehicle, capture, via the one or more cameras, one or more images of the license plate of the second vehicle, determine a license plate number from the captured one or more images of the license plate, and storing the determined license plate number and the image of the license plate indicia in an audio head unit or in a navigation unit.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
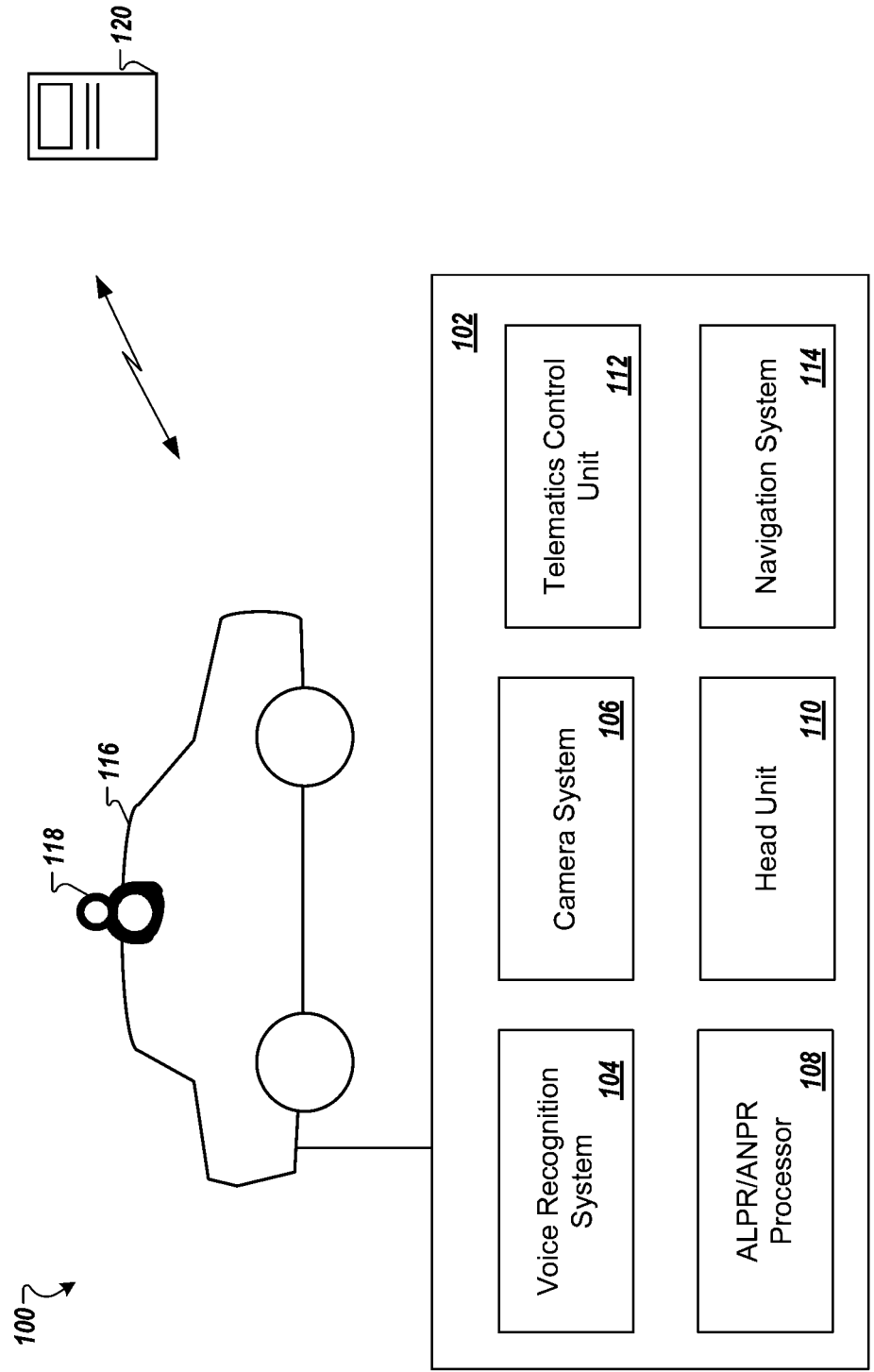
FIG. 1 is a schematic of a system environment for acquiring license plate numbers and reporting traffic violation according to one example.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Referring now to the drawings, wherein like reference numerals designate identical or corresponding parts throughout several views, the following description relates to a system and associated methodology for automatically capturing and reporting a license plate number.

A driver may want to report dangerous and careless driving of other drivers. For example, a driver may notice that another driver is driving very carelessly, aggressively, speeding, dangerously switching lines without signaling, or other behavior that may indicate that the driver may be drunk. The driver may also want to report a traffic violation. The driver may want to report the license plate of the other vehicle without jeopardizing his own safety. The license plate may not be completely visible. Further, the driver may have a hard time memorizing the license plate number while focusing on the driving and maintaining control of the steering wheel. In another example, the driver may be involved in an accident and may need to report the license plate number of the other vehicle.

The driver may use voice recognition to request capture and to report the license plate number involved in the traffic violation. The system described herein may capture the license plate, determine the license plate number, display and record the license plate number on an audio head unit and/or navigation unit of the vehicle. Also, the system may report the traffic violation to a call center through a telematics electric control unit (ECU).

FIG. 1 is a schematic of a system environment 100 for acquiring license plate numbers and reporting traffic violation according to one example. The system 102 may include a voice recognition system 104, a camera system 106, an automatic license plate recognition (ALPR) processor and/or an automatic number plate recognition (ANPR) processor 108, a head unit 110, a telematics control unit (TCU) 112, and a global navigation system 114.

The voice recognition system 104 is configured to receive voice commands from a vehicle user 118 and control one or more systems of a vehicle 116 based on the detected commands. The voice command may include a request to capture the license plate of another vehicle. Once the voice recognition system 104 detects the request, the voice recognition system 104 may activate the ALPR/ANPR processor 108 as described further below.

The ALPR/ANPR processor 108 may activate the camera system 106 to capture the license plate as described further below. The ALPR/ANPR processor 108 recognizes the license plate number from the captured license plate number. The ALPR processor typically utilizes optical character recognition (OCR) (e.g., pattern matching, pattern recognition, feature extraction) to determine the text on the license plate. Further, the ALPR/ANPR processor 108 may send the recognized license plate number and associated information via an internal record network or a virtual network controller (VNC) bus of the vehicle 116 to the head unit 110. The head unit 110 may display the license plate number and store the license plate number in a memory of the head unit 110.

The camera system 106 may include one or more infrared cameras that can capture license plates during daytime and nighttime. The camera system 106 is activated by the ALPR/ANPR processor 108. The one or more cameras may be positioned on the roof of the vehicle 118, or on the front or rear of the vehicle 116 based on a particular application and the specification of the one or more cameras. In addition, the processor 108 may activate one of the one or more cameras based on the information received from the vehicle user 118. For example, a front camera may be activated when the voice command received from the vehicle user 118 indicates that the other vehicle (i.e., target vehicle) is in front of vehicle 116. The camera may take one or more photos of the target vehicle. The camera also takes a zoomed image of the license plate. In one implementation, the camera may be rotated based on a control signal received from the processor 108. The control signal may include an angle of rotation for the camera or a direction. For example, the user command detected by the voice recognition system 104 may include a location of the other vehicle (or relative location with respect to vehicle 116). The voice command may be "Capture the license plate of the vehicle that just passed me on the left." Thus, the control signal may include information for the camera to rotate to the specified direction. The camera system 106 may capture a video sequence or multiple successive images.

The head unit 110 may provide audio and video services to the vehicle user 118. The head unit 110 may also provide navigation services, entertainment such as music, heating, ventilating, and air-conditioning information. The head unit 110 is configured to display the license plate number. The memory of the head unit 110 is configured to store the captured license plate number.

The head unit 110 may receive inputs from the vehicle user 118 via one or more user interfaces (e.g., console display, dash display). The user interface may include buttons, a multiple touch input device, a microphone, and speakers. The microphone may be configured to receive user voice commands The vehicle user 118 may retrieve store license plate numbers using the user interface.

The vehicle 116 may also include an instrument panel. The instrument panel may also include a display. In one example, the instrument panel may additionally or alternatively display the license plate number.

The TCU 112 may be a data communication module (DCM) that provides communications over a network to any server that may be included with multiple services available to a vehicle user 118. For example, the TCU 112 may connect to a call center available to the vehicle user 118. The TCU 112 may upload the license plate number to the call center in response to the vehicle user request. The TCU 112 may automatically upload the license plate number and associated information to a server 120. The vehicle user 118 may retrieve the stored license plate numbers and associated information from the server 120 using an electronic device (e.g., laptop, smartphone, desktop computer). The network may be a cellular network.

The cellular network may include a plurality of base stations that are configured to receive and transmit data over wired systems such as public switched telephone network (PSTN) and backhaul networks. The cellular network can include wide area networks, metropolitan area networks, the Internet, satellite networks, or the like. Thus, the base stations include one or more antennas, transceivers, and processors that execute machine readable instructions to exchange data over various wired and/or wireless networks.

The global navigation system 114 is configured to determine a position of the vehicle 116. The position may be associated with the detected license plate number. The position of the vehicle may also be stored in the memory. In addition, the stored information may include a timestamp that includes the date and time. The stored information may also include the one or more photos acquired by the camera system 106.

The modules and units described herein may be implemented as either software and/or hardware modules and may be stored in any type of computer-readable medium or other computer storage device. For example, each of the modules described herein may be implemented in circuitry that is programmable (e.g., microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programing language such as Java, C, or assembly. One or more software instructions in the modules may be embedded in firmware, such as an erasable programmable read-only memory (EPROM)

Figure 2A:
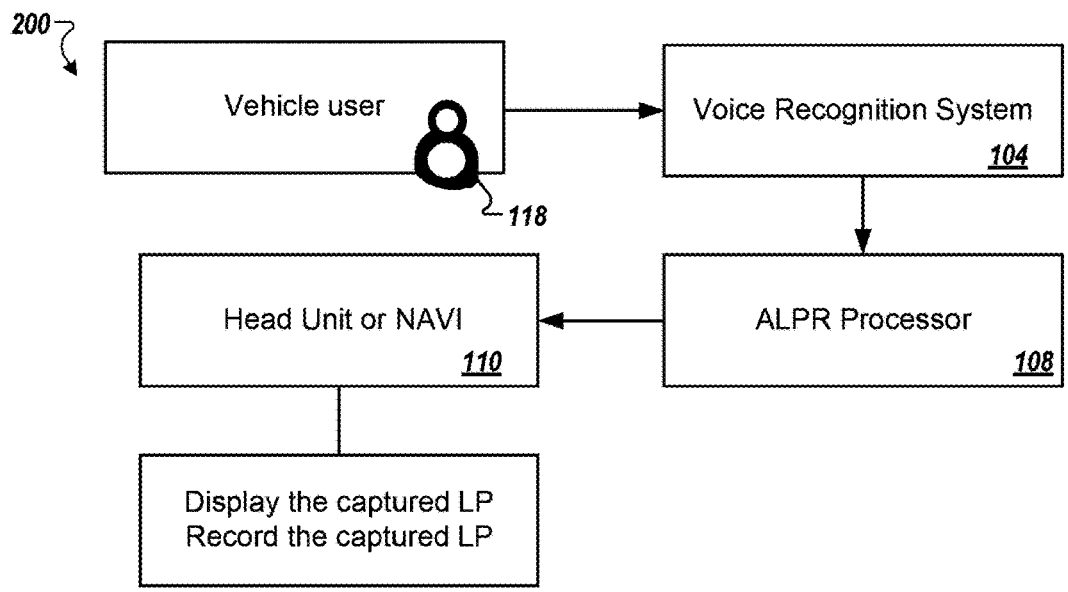
FIG. 2A is a flow diagram of an example system operational flow for acquiring a license plate number according to one example.

FIG. 2A is a flow diagram 200 of an example system operational flow for acquiring a license plate number according to one example. The flow diagram shows the data and command flow in the system 102 according to one example. The voice command from the vehicle user 118 (e.g., driver) is received by the voice recognition system 104. In response to detecting that the voice command includes a request from the vehicle user 118 to capture a license plate, the voice recognition system 104 sends an activation signal to the ALPR/ANPR processor 108. Once the ALPR/ANPR processor 108 detects the activation signal, the ALPR/ANPR processor 108 activates the camera system 106. The ALPR/ANPR processor 108 receives the captured license plate and may determine the license plate number. The ALPR/ANPR processor 108 sends the license plate number to the head unit 110. The audio head unit 110 or navigation system may display and record the captured license plate.

The vehicle user 118 may retrieve the stored license number at a later time, for example, when the vehicle is safely parked. The vehicle user 118 using the user interface may also delete the stored license plate number.

Figure 2B:
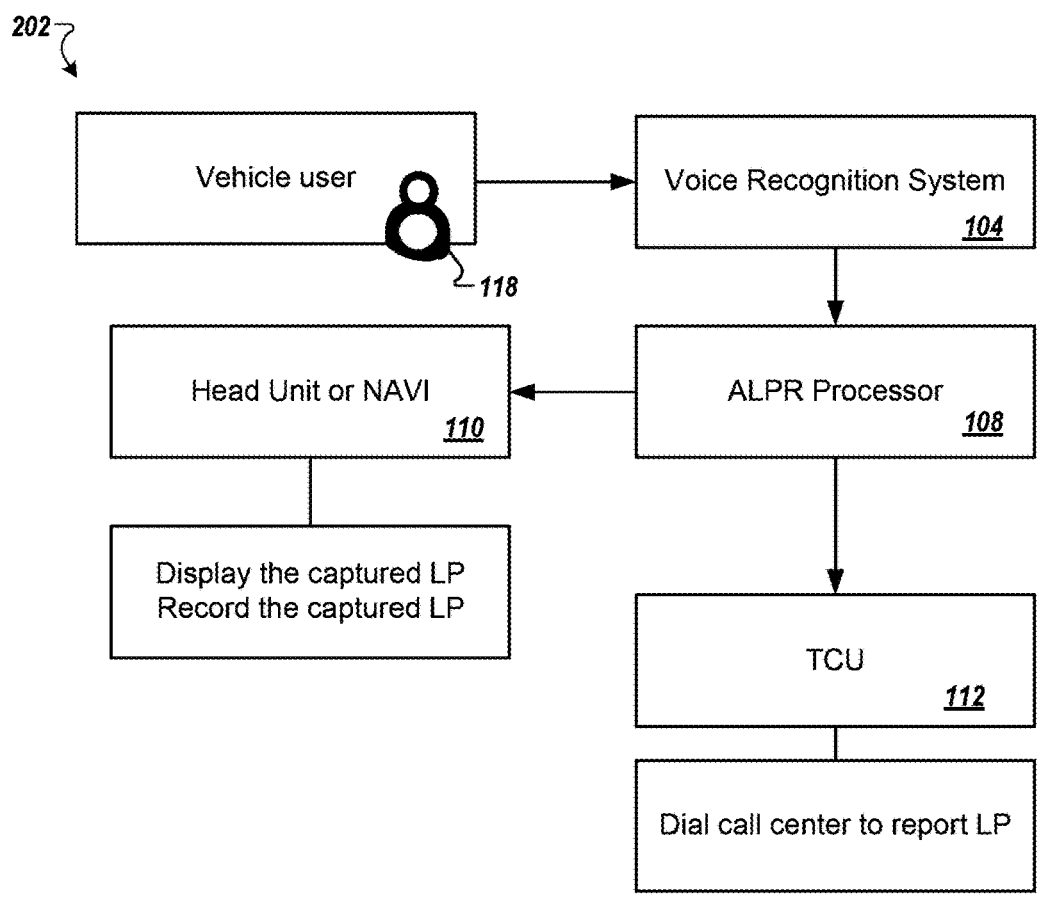
FIG. 2B is a flow diagram of an example system operation flow for acquiring and reporting the license plate number according to one example.

In one example, the voice recognition system 104 may determine that the vehicle user's command includes a request to upload the detected the license plate number to the call center. For example, when the other driver is driving extremely dangerously and the vehicle user want to report the license plate number to the authority urgently. As shown by flow diagram 202 in FIG. 2B, the ALPR/ANPR processor 108 may send the license plate number to the TCU 112. The TCU 112 may connect to the call center to report the license plate number.

In one implementation, the system 102 may upload the detected the license plate number to the call center in response to determining that the same license plate number was previously detected. For example, when the same license plate number is detected within a predetermined time period (e.g., one minute), the license plate number may be uploaded to the call center. In one implementation, the license plate number may be uploaded to the call center when the same license number is detected two or more times successively.

Figure 3A:
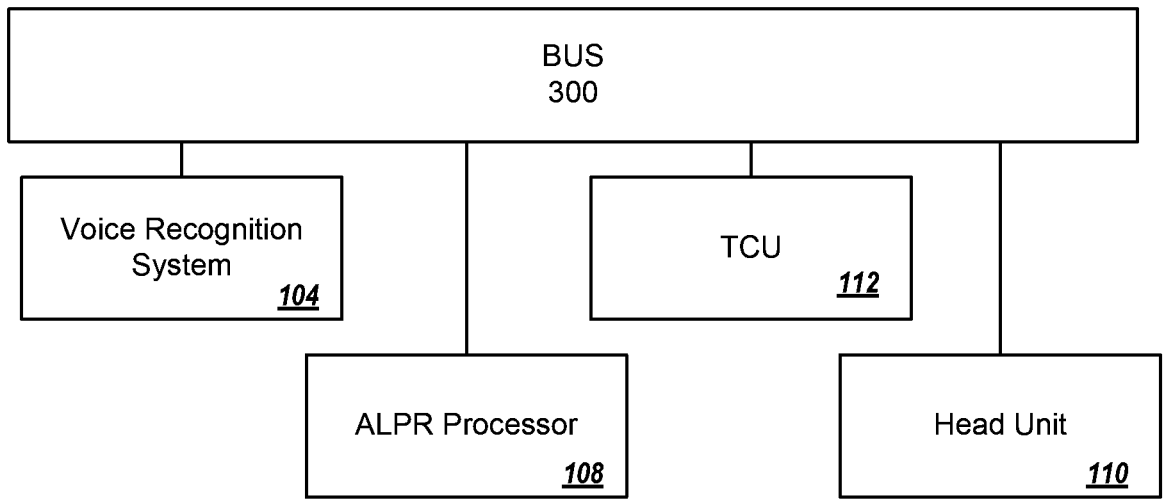
FIG. 3A is a schematic that shows a communication bus in a vehicle according to one example.

FIG. 3A is a schematic that shows a communication bus 300 in the vehicle 116 according to one example. The voice recognition system 104, the ALPR processor 108, the TCU 112, and the head unit 110 may be connected to each other via a bus 300. Exemplary communication buses in the vehicle 116 are described in FIG. 5.

Figure 3B:
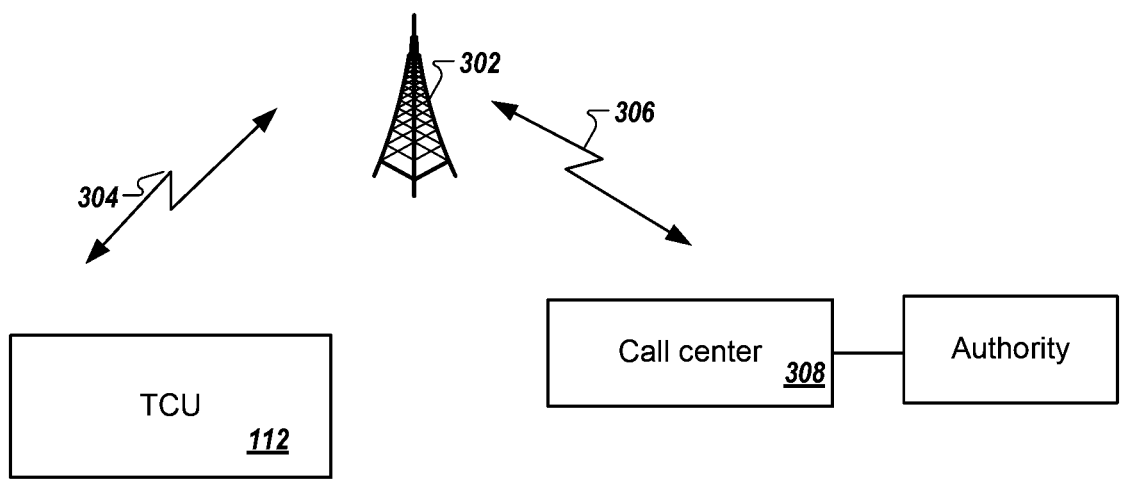
FIG. 3B is a schematic that shows a communication link between the vehicle and a call center according to one example.

FIG. 3B is a schematic that shows a communication link between the vehicle 116 and the call center 308 according to one example. The TCU 112 may be in communication with a network controller 302 or a base station. The network controller 302 and the TCU 112 establish communication channels 304 and exchange data of any type. Further, the network controller 302 may establish communication channels 306 with the call center 308. The call center 308 may report the received license plate numbers to authorities.

Figure 4:
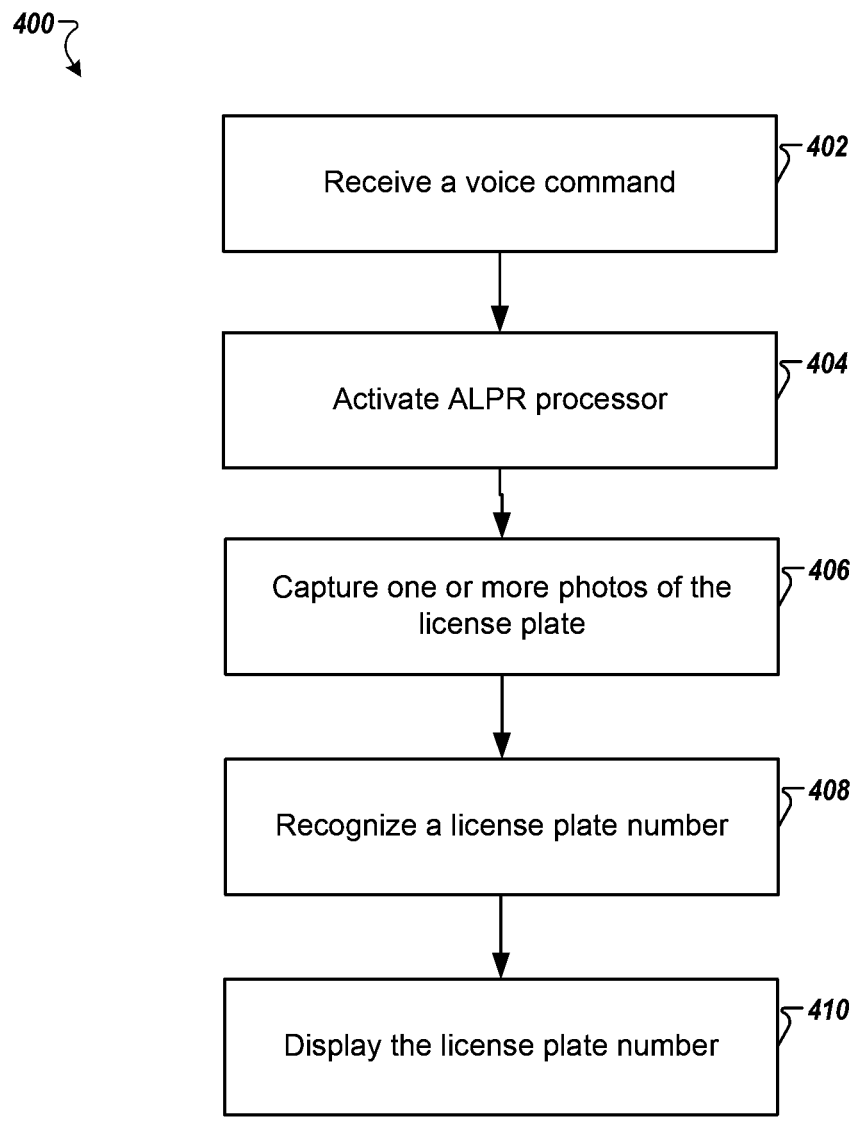
FIG. 4 is a flowchart of a method for acquiring license plate numbers and reporting traffic violation according to one example.

FIG. 4 is a flowchart of a method 400 for recording license plate indicia (e.g., alpha-numeric characters and additional graphic information) and reporting traffic violation according to one example. The method 400 may be implemented by the system 102.

At step 402, the voice recognition system may detect a voice command from the vehicle user. The voice command may indicate the location of the other vehicle.

At step 404, the ALPR processor is activated. The ALPR processor 108 may activate the camera system. At step 406, the camera system may capture one or more images of the vehicle indicated in the voice command The camera system may send the captured images to the ALPR processor 108. In one implementation, the camera system may capture images covering the whole surrounding of the vehicle 116 when the voice command does not include a location or direction of the other vehicle. For example, if the camera system includes a front camera and a back camera, both the front and back camera are activated.

At step 408, the ALPR processor 108 determines the license plate number from the captured images. The ALPR processor 108 may send the determined license plate number to the head unit 110 for display. Further, the ALPR processor 108 may acquire additional information such as the location of the vehicle 116 from the navigation system 114. The ALPR processor 108 associates the location to the license plate number. In one example, when the ALPR processor 108 recognizes two or more license plate numbers, the ALPR processor 108 may include in the associated information a specific designation such as "potential" to indicate to the vehicle user 118 that not all the captured license plate numbers are associated with vehicles involved in a traffic violation. The vehicle user 118 may at a later time identifies or confirms the license plate number involved in the traffic violation.

At step 410, the head unit 110 may display the license plate number. The head unit 110 may store the license plate number and the additional information. In one implementation, the system may check whether the vehicle user command includes a request to upload the license plate number to the call center. In response to determining that the vehicle user command includes a request to connect to the call center, the ALPR processor upload the license plate number to the call center via the TCU 112.

The ALPR processor also stores the determined license number and the image of the license plate indicia in the head unit or the navigation unit. If the determined license plate number is incorrect, then the additional indicia may be useful in later identifying the vehicle.

A system which includes the features in the foregoing description provides numerous advantages to users. In particular, the system provides a method for automatically capturing and reporting traffic violation which increase road safety. In addition, recognizing and transmitting the license plate number and causing the license plate number to display on the head unit and to be automatically uploaded to the call center provide time sensitive information to the authorities.

Figure 5:
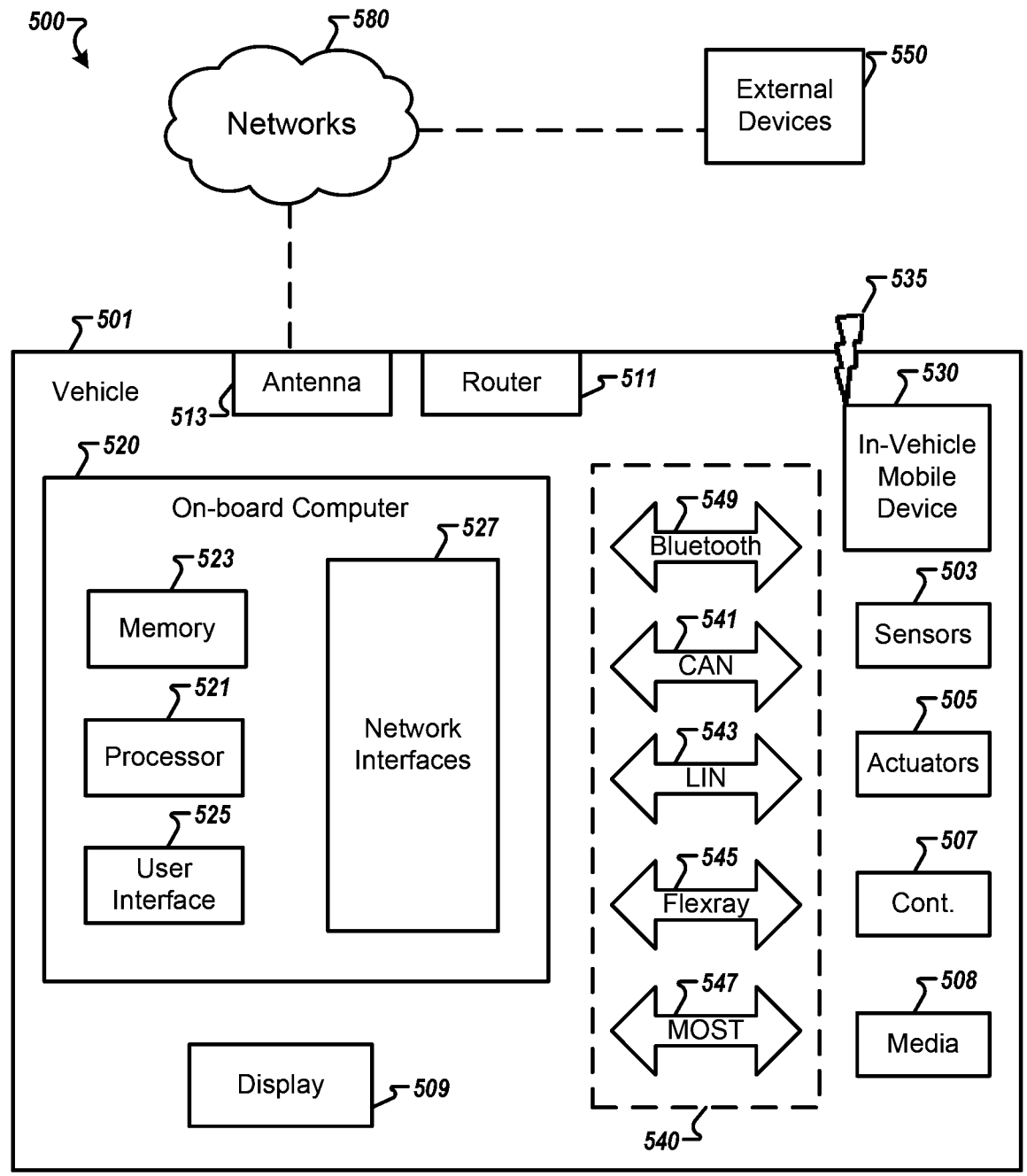
FIG. 5 is a block diagram of a vehicle environment according to one example.

FIG. 5 is a simplified block diagram of a vehicle environment 500 in which embodiments of the invention disclosed herein may be implemented. The vehicle environment 500 includes a vehicle 501 in communication with one or more external devices 550 by way of one or more external networks 580. Vehicle 501 also includes various internal networks 540 for interconnecting several vehicle devices within the vehicle as will be discussed below. The vehicle environment 500 may also include one or more in-vehicle mobile device 530. External devices 550 include any device located outside the vehicle 501 such that the external device must communicate with the vehicle and its devices by an external network 580. For example, the external devices may include mobile devices, electronic devices in networked systems (e.g., servers or clients in a local area network (LAN), etc.), on board computers of other vehicles etc. In-vehicle mobile devices 530 are devices which are located within, or in the vicinity of the vehicle 501 such that the in-vehicle mobile device can communicate directly with internal networks 540 of the vehicle 501. In-vehicle mobile devices 530 may also connect with external networks 580.

Vehicle 501 includes vehicle devices integral with or otherwise associated with the vehicle 501. In the embodiment of FIG. 5, vehicle devices include one or more sensors 503, one or more actuators 505, one or more control units 507, one or more media systems 508, one or more displays 509, one or more routers 511, one or more antenna 513, and one or more on board computers 520. As used herein, the term "vehicle device" is meant to encompass sensors, actuators, controllers, electronic control units (ECUs), detectors, instruments, embedded devices, media devices including speakers, a CD and/or DVD player, a radio, vehicle navigation systems (e.g., GPS) displays, other peripheral or auxiliary devices or components associated with the vehicle 501.

Sensors 503 detect various conditions within (or in the immediate vicinity of) the vehicle 501. For example, sensors 503 may be temperature sensors, photosensors, position sensors, speed sensors, angle sensors or any other sensor for detecting a diagnostic condition or other parameter of the vehicle 501 or its ambient environment. Sensors 503 may be passive or "dumb" sensors that provide an analog representative of the sensed parameter, or so called "smart" sensors with integrated memory and digital processing capability to analyze the parameter sensed within the sensor itself. Actuators 505 cause motion of some mechanical element of the vehicle in response to a control signal. For example, actuators 505 may be hydraulic actuators, pneumatic actuators or electrical/electronic actuators such as a stepper motor. Actuators 505 may be used to move vehicle lighting devices to implement intelligent light, for example.

On-board computer 520 is a vehicle device for providing general purpose computing functionality within the vehicle 501. The on-board computer 520 typically handles computationally intensive functions based on software applications or "apps" loaded into memory. On-board computer 520 may also provide a common interface for different communication networks in the vehicle environment 500. On-board computer 520 includes one or more processor 521, one or more memory 523, one or more user interface 525 (e.g., the operator interface described previously herein), and one or more network interface 527.

Multiple internal vehicle networks represented by 540 may exist in the vehicle 501 to provide communication pathways to various vehicle devices distributed throughout the vehicle 501. An internal vehicle network 540 is a collection of nodes, such as vehicle devices, integrated with or otherwise linked to the vehicle and interconnected by communication means. Vehicle networks 540 typically include hard wired bus type networks, each providing communication pathways to particular vehicle devices distributed throughout a vehicle. FIG. 5 shows four examples of such hard wired networks: Controller Area Network (CAN) 541, Local Internet Network (LIN) 543, Flexray bus 545, and Media Oriented System Transport (MOST) network 547.

Other hard wired internal networks such as Ethernet may be used to interconnect vehicle devices in the vehicle 501. Further, internal wireless networks 549, such as near field communications, Bluetooth, etc. may interconnect vehicle devices.

Users (driver or passenger) may initiate communication in vehicle environment 500 via some network, and such communication may be initiated through any suitable device such as, in-vehicle mobile device 530, display 509, user interface 525, or external devices 550.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for recording and reporting license plate indicia, the method comprising:
   receiving, using processing circuitry, an input command from a user of a vehicle requesting a capture of an image of license plate indicia of a second vehicle, the input command being a voice command including second vehicle information, the second vehicle information including a location of the second vehicle;
   capturing, via one or more cameras, one or more images of the license plate of the second vehicle, the one or more cameras being identified based on the location of the second vehicle information;
   determining, using the processing circuitry, a license plate number from the captured one or more images of the license plate; displaying the determined license plate number using a head unit of the vehicle;
   detecting a location of the vehicle; and storing the determined license plate number, the location of the vehicle, and the image of the license plate indicia in the head unit, wherein the head unit provides navigation services.

2. The method of claim 1, further comprising:
   uploading the determined license plate number to a server associated with a call center.

3. The method of claim 2, wherein the license plate number is uploaded when the input command indicates urgency.

4. The method of claim 2, wherein the license plate number is uploaded to the server when a license plate number is detected two or more times in a predetermined period.

5. The method of claim 4, wherein the license plate number is uploaded when the same license number is detected successively.

6. The method of claim 1, further comprising:
   rotating the identified one or more cameras to a direction indicated in the input command.

7. The method of claim 1, further comprising:
   associating a timestamp and the one or more images with the recognized license plate number.

8. A system for recording and reporting license plate indicia, the system comprising:
   one or more cameras; and processing circuitry configured to receive an input command from a user of a vehicle requesting a capture of an image of license plate indicia of a second vehicle,
   the input command being a voice command including second vehicle information, the second vehicle information including a location of the second vehicle,
   capture, via the one or more cameras, one or more images of the license plate of the second vehicle, the one or more cameras being identified based on the location of the second vehicle, determine a license plate number from the captured one or more images of the license plate, and
   display the recognized license plate number on a head unit of the vehicle, detect a location of the vehicle, and
   store the determined license plate number, the location of the vehicle, and the image of the license plate indicia in the head unit,
   wherein the head unit provides navigation services.

9. The system of claim 8, wherein the processing circuitry is further configured to:
   upload the determined license plate number to a server associated with a call center.

10. The system of claim 9, wherein the license plate number is uploaded when the input command indicates urgency.

11. The system of claim 9, wherein the license plate number is uploaded to the server when a license plate number is detected two or more times in a predetermined period.

12. The system of claim 8, wherein the processing circuitry is further configured to:
rotate the identified one or more cameras to a direction indicated in the input command.

13. The system of claim 8, wherein the processing circuitry is further configured to:
associate a timestamp and the one or more images with the recognized license plate number.

14. A non-transitory computer readable medium storing computer-readable instructions therein which when executed by a computer cause the computer to perform a method for recording and reporting license plate indicia, the method comprising:
receiving an input command from a user of a vehicle requesting a capture of an image of license plate indicia of a second vehicle, the input command being a voice command including second vehicle information,
the second vehicle information including a location of the second vehicle; capturing, via one or more cameras, one or more images of the license plate of the second vehicle, the one or more cameras being identified based on the location of the second vehicle;
determining a license plate number from the captured one or more images of the license plate;
displaying the recognized license plate number on a head unit of the vehicle; detecting a location of the vehicle; and storing the determined license plate number, the location of the vehicle, and the image of the license plate indicia in the head unit,
wherein the head unit provides navigation services.

15. The method of claim 1, further comprising:
associating a specific designation with the stored determined license plate number when two or more license plate numbers are recognized.

16. The method of claim 2, wherein the license plate number is uploaded to the server when the same license plate number is detected two or more times successively.

17. The method of claim 2, wherein the license plate number is uploaded to the server when the same license plate number is detected within a predetermined period of time.

* * * * *